US007251662B2

(12) United States Patent
Behman et al.

(10) Patent No.: US 7,251,662 B2
(45) Date of Patent: Jul. 31, 2007

(54) SYSTEM AND METHOD FOR MANIPULATING A REGISTRY

(75) Inventors: Daniel D. Behman, Toronto (CA); Mark F. Wilding, Barrie (CA)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 10/424,201

(22) Filed: Apr. 25, 2003

(65) Prior Publication Data

US 2003/0204715 A1 Oct. 30, 2003

(30) Foreign Application Priority Data

Apr. 29, 2002 (CA) .................................. 2384181

(51) Int. Cl.
*G06F 7/00* (2006.01)
(52) U.S. Cl. ...................................... 707/101; 707/100
(58) Field of Classification Search ...... 707/100–104.1
See application file for complete search history.

(56) References Cited

U.S. PATENT DOCUMENTS

| 5,822,580 | A | 10/1998 | Leung .................... 707/103 R |
|---|---|---|---|
| 5,991,538 | A | 11/1999 | Becker ....................... 117/140 |
| 6,085,030 | A | 7/2000 | Whitehead et al. ......... 709/203 |
| 6,183,027 | B1 | 2/2001 | Tsao |
| 6,301,710 | B1 | 10/2001 | Fujiwara ..................... 717/175 |
| 6,438,590 | B1 * | 8/2002 | Gartner et al. .............. 709/219 |
| 6,496,875 | B2 * | 12/2002 | Cheng et al. .................. 710/1 |
| 6,553,377 | B1 * | 4/2003 | Eschelbeck et al. .......... 707/10 |
| 6,763,454 | B2 * | 7/2004 | Wilson et al. ................. 713/1 |
| 6,904,454 | B2 * | 6/2005 | Stickler ...................... 709/213 |
| 6,963,908 | B1 * | 11/2005 | Lynch et al. ................ 709/220 |
| 2002/0099634 | A1 * | 7/2002 | Coutts et al. ................. 705/35 |
| 2003/0009538 | A1 * | 1/2003 | Shah et al. ................. 709/219 |
| 2003/0014656 | A1 | 1/2003 | Ault et al. ...................... 726/6 |

FOREIGN PATENT DOCUMENTS

EP 992898 A1 12/2000

OTHER PUBLICATIONS

David Huston, "The Squeaky Clean Computer Lab: How to maintain your Macs and PCs as well as your sanity!", ACM, 1998, pp. 21-28.*

(Continued)

*Primary Examiner*—Don Wong
*Assistant Examiner*—Linh Black
(74) *Attorney, Agent, or Firm*—Sawyer Law Group LLP

(57) ABSTRACT

A system, method and facility for manipulating registries on a computer system. The system includes a generic registry facility, which features functions classified according to the breadth of their applicability to varying types of registries. The registries may be classified as file-based and proprietary. The file-based registries may be binary or text-based. The generic registry facility provides a library of generic registry facility functions that may be included in a specific registry manipulation module through which a computer program can manipulate a specific registry. The generic registry facility functions may be customized by the developer of the registry manipulation module for a specific registry. The functions may include an action verification function that includes a commit sequence for ensuring that requested changes to a registry are made successfully. The functions may also include a trigger function for triggering events upon the occurrence of a change to a registry.

34 Claims, 3 Drawing Sheets

OTHER PUBLICATIONS

David Botton, "Interfacing Ada 95 to Microsoft COM and DCOM Technologies", Ada Core technologies, Inc., ACM, 1999, pp. 9-14.*

Dave Angel and Andy Wilson, How Do I Store a Java App in a Self-Executing Encrypted File?, Dr. Dobb's Journal, Feb. 1999, pp. 115-120.

* cited by examiner

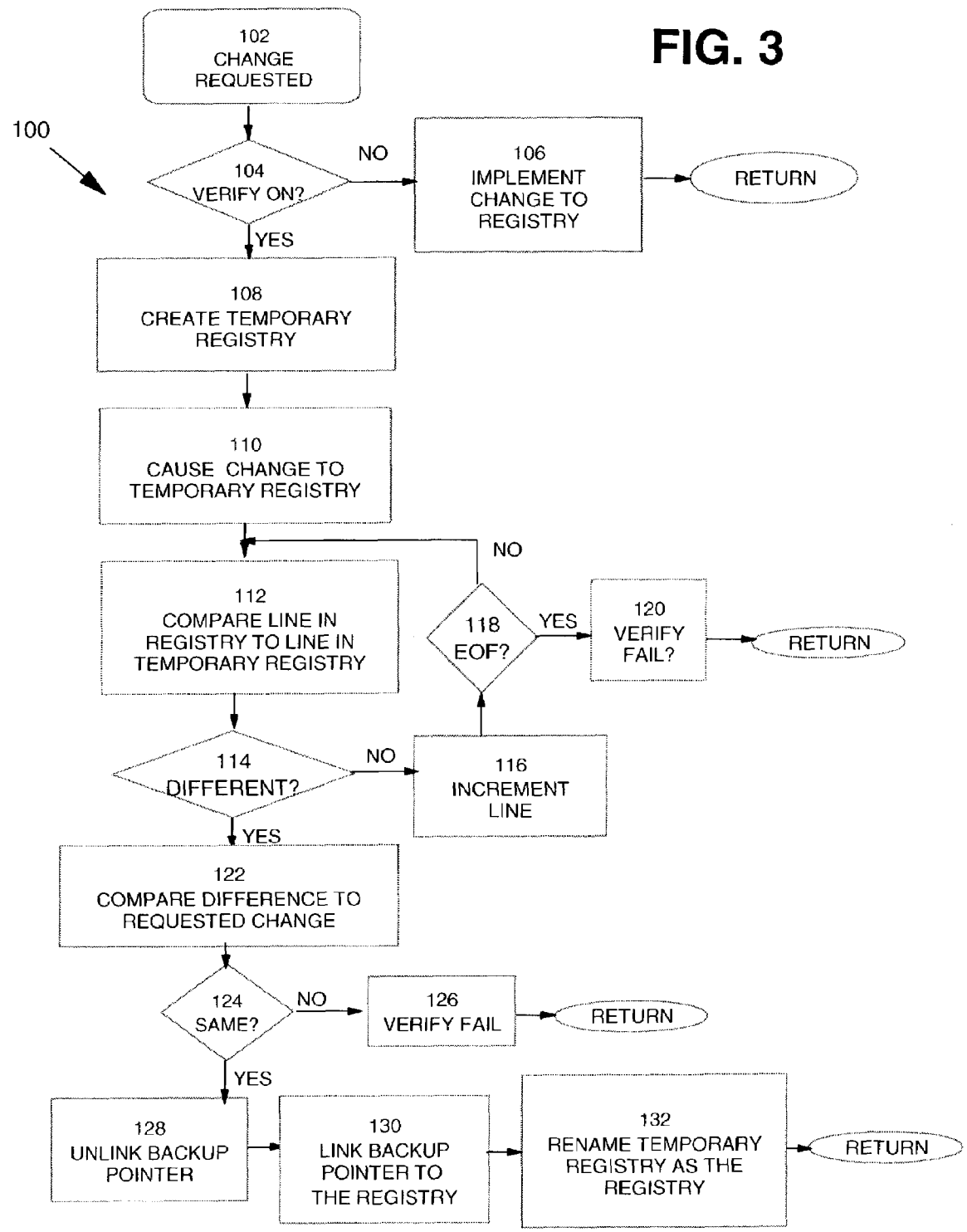

SYSTEM AND METHOD FOR MANIPULATING A REGISTRY

CROSS-REFERENCE TO RELATED APPLICATIONS

This application claims benefit under 35 USC 119 of Canadian Application 2,384,181 on Apr. 29, 2002.

FIELD OF THE INVENTION

The present invention relates to computer systems and, in particular, to a system and method for manipulating a registry.

BACKGROUND OF THE INVENTION

With almost any computer program, it is necessary to manipulate information stored on a persistent media from time to time. Usually the information is stored in some type of registry, which could be a typical file for a particular operating system. Other than a typical flat file, a registry could be a proprietary storage mechanism, such as the Windows™ registry on the Microsoft Windows™ operating system, which may be manipulated using particular application programming interfaces.

A registry, in this context, stores a set of information that the computer program may wish to read, add to, delete or otherwise manipulate. The information is typically configuration information for the computer hardware, the operating system, the computer program or any other computer software or services. For example, on Unix™ based operating system the /etc/services registry stores configuration information for the services and protocols assigned to particular ports, such as telnet, ftp, or other services.

In order to manipulate a particular registry, the developer of a computer program must provide the computer program with the functionality necessary to perform the registry level functions needed to access and manipulate the particular registry. Because even amongst file-based registries, the registries can vary as to type (i.e. binary or text-based) and can further vary as to specific format, the computer program must contain code for manipulating each individual registry. As a result, the developer is required to duplicate a large amount of code and must devote time and effort to developing individual portions of code specific to each registry.

When manipulating a registry containing configuration information, a developer must be cautious to ensure that any changes to the registry do not cause problems for the availability of the computer system or any active processes. Changes to a registry can render a system unstable or unusable under some circumstances. Developers may also be concerned that other active processes that rely upon the registry being manipulated receive adequate notice of any changes. This is particularly difficult if the configuration information is common across multiple systems, such as in a cluster network. Additionally, developers may need to ensure that any manipulation of sensitive configuration information has been performed correctly before the manipulated configuration information is used by other processes or systems.

SUMMARY OF THE INVENTION

Accordingly, it would be advantageous to provide a set of generic tools for developers to use in accessing and manipulating registries of all types and formats so as to reduce the time and effort expended in creating computer programs that interact with multiple registries.

The present invention provides a generic registry facility that permits the encapsulation of access and manipulation actions for a specific registry. Registry-specific information needed to customize particular manipulation actions to the specific registry are provided through a registry manipulation module. The invention thereby permits any controlling product to access and manipulate the specific registry using generic commands without requiring intimate knowledge of the particular actions necessary to access and manipulate the specific registry.

In a further aspect, the present invention provides a registry manipulation system for use by a computer program in manipulating a specific registry on a computer system. The registry manipulation system includes a registry manipulation facility which itself includes a plurality of generic functions for manipulating registries, the generic functions being defined within classes. The classes include a first level class and a second level class, wherein the second level class inherits the generic functions of the first level class. The system also includes a registry manipulation module that includes a registry-specific definition for the specific registry. The registry manipulation module inherits the generic functions of the second level class. The first level class provides an interface usable by the computer program to manipulate the specific registry and the second level class provides support for the type of storage for the specific registry.

In another aspect, the present invention provides a computer program product that includes a computer readable medium having a program means thereon. The program means includes code means for providing the registry manipulation facility and the registry manipulation module.

In another aspect, the present invention provides a registry manipulation facility having generic functions that include a manipulation function for performing a requested change to the specific registry and a verify action function for verifying that the requested change was successful. The manipulation function includes creating a temporary registry, the temporary registry being a copy of the specific registry, and causing the requested change to be made to the temporary registry. The verify action function includes comparing the temporary registry to the specific registry to identify a difference between them, comparing the difference to the requested change to determine if the difference and the requested change match, and for replacing the specific registry with the temporary registry when the difference matches the requested change.

In another aspect, the present invention provides a registry manipulation facility having generic functions that include a manipulation function for performing a requested change to the specific registry, and a trigger function for performing an action in response to the performance of the requested change to the specific registry.

In yet another aspect, the present invention provides a method for implementing a requested change to a registry on a computer system. The method includes the steps of creating a temporary registry, the temporary registry being a copy of the registry, causing the requested change to be made to the temporary registry, comparing the temporary registry to the registry to identify a difference between them, comparing the difference to the requested change to determine if the difference and the requested change match, and replacing the registry with the temporary registry if the difference and the requested change match.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

FIG. 3 shows a method for implementing a requested change to a registry on a computer system, according to the present invention.

DETAILED DESCRIPTION

Figure 1:
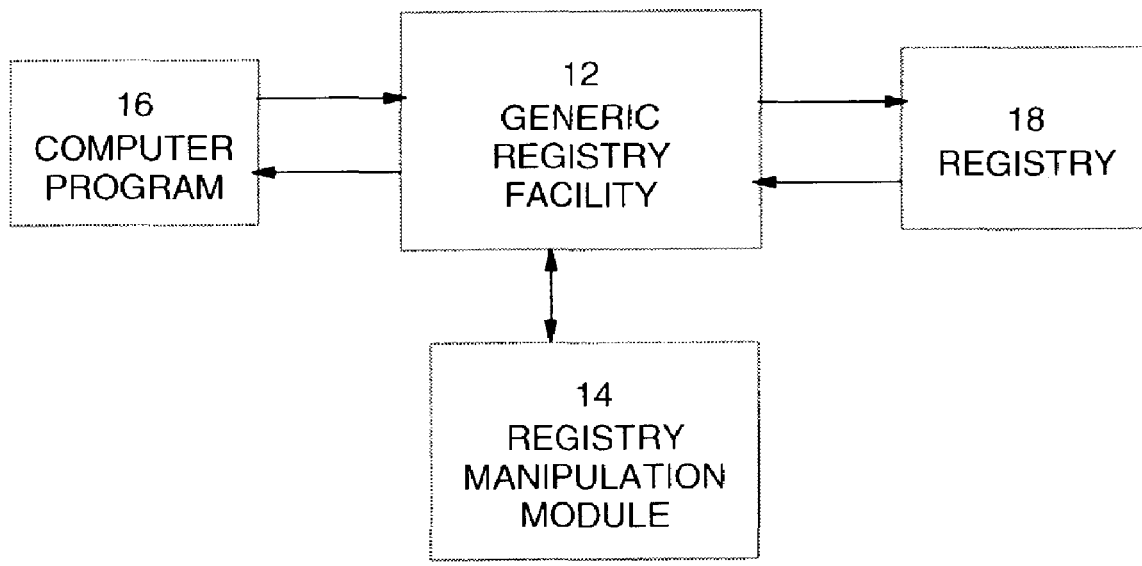
FIG. 1 shows a block diagram of a generic registry facility and a registry manipulation module, according to the present invention.

Reference is first made to FIG. 1, which shows in block diagram form a generic registry facility 12 and a registry manipulation module 14, according to the present invention, in use with a computer program 16 to manipulate a registry 18.

The registry-specific details of the module 14 are selected by the developer of the module 14 for the specific registry 18. The registry manipulation module 14 contains registry-specific information in order to customize the operation of the generic registry facility 12 to the specific registry 18. The computer program 16 may call functions provided by the generic registry facility 12 and customized to the specific registry 18 using the registry manipulation module 14. As will be understood by those skilled in the art, the computer program 16 may be developed so as to integrally contain the module 14, although they are depicted separately in FIG. 1. It will also be understood that a single computer program 16 may interact with a facility 12 having a plurality of registry manipulation modules 14 so as to manipulate a plurality of registries 18. The computer program 16 may include any object, process or service that is intended to manipulate a registry 18 in some way.

The effect of the generic registry facility 12 and the registry manipulation module 14 is to encapsulate the detailed operations involved in manipulating a specific registry 18 within a set of abstracted function calls. Accordingly, a computer program 16 may manipulate a specific registry 18 without requiring the developer of the computer program 16 to devote significant time to the procedural and logistical niceties involved in accessing or manipulating the registry 18.

The generic registry facility 12 provides the abstracted function calls that may be used to manipulate the registry 18. These generic functions provide the basic operations which a computer program 16 may wish to perform upon the registry 18, including adding a record, retrieving a record, searching for a record and deleting a record. The registry manipulation module 14 may, as part of the implementation of some generic functions, include additional operations so as to customize the generic functions to the specific registry 18. This customization may include specifying record structures for the specific registry 18 or any other registry-specific details of implementation.

The generic registry facility 12 is designed to accommodate the development of a variety of modules 14 developed to manipulate a variety of registries 18. Some of the operations particular to the manipulation of one registry 18 will differ from the operations necessary to perform the same manipulation of a different registry 18. In order to provide for functions that operate effectively for all registries, the generic registry facility 12 recognizes a classification of registries. The specificity of a generic function depends upon whether the operation being performed can be generalized to a wider class of registries. In some cases, a generic function is defined in broad terms at a high level and is further defined in lower levels, where more specific operations are added to the function. This provides the facility with the flexibility to grow at lower levels to accommodate a greater variety of registries.

Referring to FIG. 1, another variation of another preferred embodiment of the present invention is the inclusion of some or all of the class hierarchy 22 and 28 between the base class 21 and the registry module layer 34 into either the base class or the registry module. For example, if the implementation of the invention is limited to a file based storage only, the file storage related functions from 22 could be included into the base class 21. Yet another variation of the preferred embodiment of the present invention is the exclusion of either the binary 32 or text 30 classes. If a specific implementation only requires support for binary based registries 32, class 30 could be excluded. Similarly, if a specific implementation only requires support for text based registries 30, class 32 could be excluded. In this form of the invention, the functions for the remaining class could be moved into the file based class 24 or into the registry module layer 34.

Figure 2:
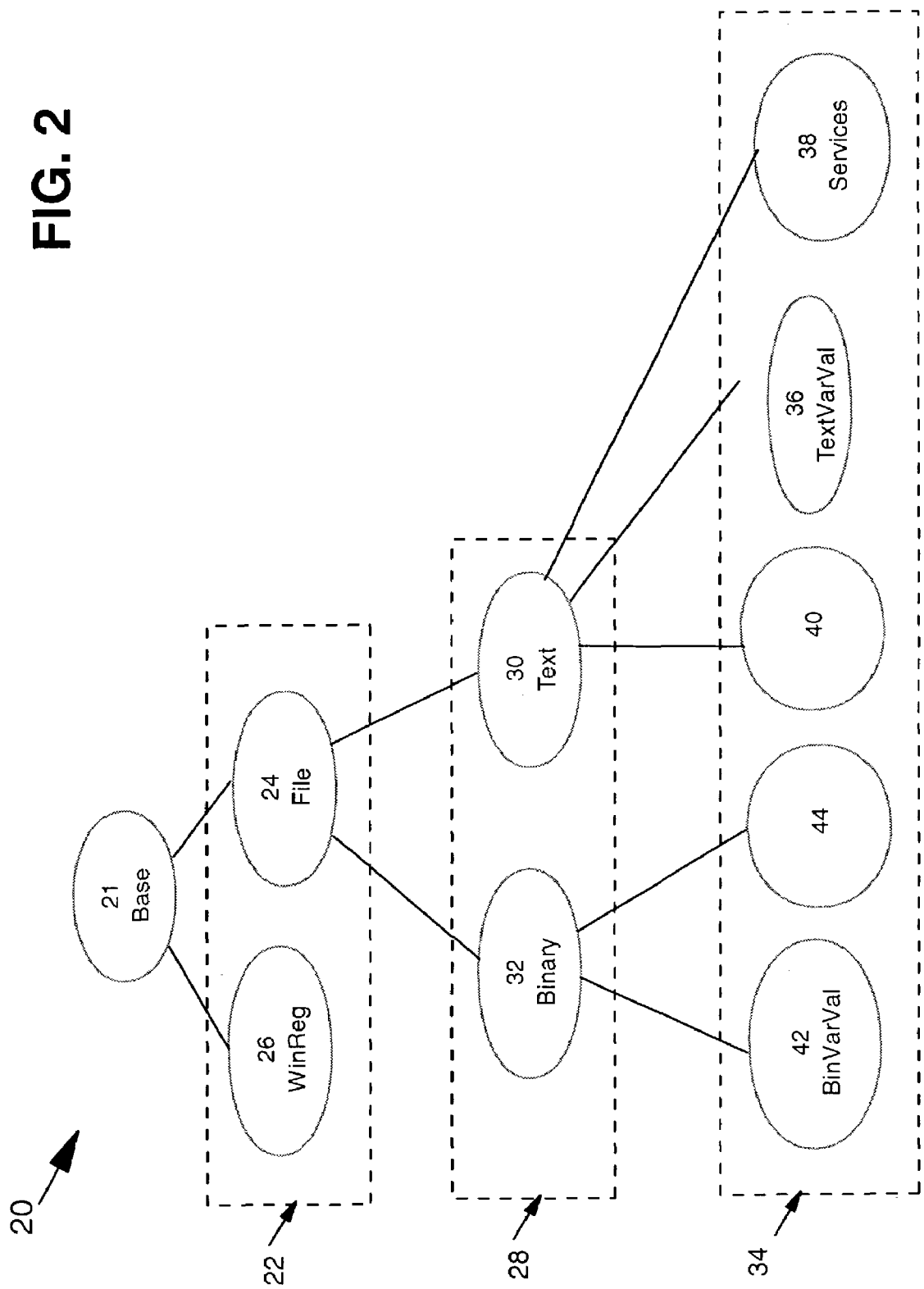
FIG. 2 shows a diagrammatic representation of the class structure for classification of registries, according to the present invention.

Reference is now made to FIG. 2, which shows a diagrammatic representation of a class structure 20 for classification of registries, according to the present invention. The class structure 20 may include four levels of categorization. The first level, or base level 21, applies to all registries and provides the basic interface for interaction with the computer program 16.

The second level, or registry class level 22, classifies the registries according to the type of storage used for the registry. In one embodiment, the registries are classified as file-based 24 or proprietary 26. File-based registries 24 are registries created as typical flat files recognizable and manipulable using the operating system of the computer. These registries have an open protocol and are stored in known manner on the operating system file system. Proprietary registries 26 include registries manipulated using proprietary application programming interfaces, whereby the proprietary APIs provide a layer of abstraction or insulation from the detailed operations. An example of proprietary registries 26 is the Windows™ registry on the Microsoft Windows™ operating system.

The class structure 20 may include a third level, or type level 28, which further classifies the registries contained in the classes 24 and 26 at the registry class level 22. For example, as shown in FIG. 2, the file-based registries 24 from the registry class level 22 may be further classified at the type level 28 as either binary registries 32 or text registries 30. This classification of file-based registries 24 into binary 32 or text 30 registries may be necessary because of the different operations involved in some manipulations of these two types of file-based registry 24. With a text registry 30, functions such as adding a record, deleting a record or retrieving a record will require additional operations to parse a line into a data structure and format a data structure into a line. Binary registries 32 do not require the parsing of lines into data structures and, accordingly, the implementation of functions such as adding, deleting or retrieving will be different as between binary 32 and text 30 registries.

At the fourth level, or registry-specific level 34, the registries contained in each of the classes 30 and 32 of the type level 28 are further classified as specific registries. For example, the binary registries 32 may include any number of specific binary registries 44, including a binary variable equals value (BinVarVal) registry 42. Similarly, the text registries 30 may include a number of specific text registries 40, including a text variable equals value (TextVarVal) registry 36. As a further example, the text registries 30 may include a services registry 38, such as the etc/services registry found on Unix™ based operating systems.

The generic registry facility 12 (FIG. 1) groups its generic functions based upon the level of classification to which they may be generalized. For example, at the base level 21, functions or definitions common to all registries may be defined, such as whether to allow duplicates in a registry or whether certain features are enabled, such as an action verification feature. The generic functions for manipulating a registry 18 (FIG. 1) may be included at the base level 21 to provide for a basic interface for the computer program 16 (FIG. 1) to utilize in manipulating registries.

At the registry class level 22, the generic functions specific to a type of storage mechanism used for a registry are included or further defined. For example, with file-based registries 24, the registry class level 22 functions may include those functions that are common to file-based registries 24 irrespective of whether they are text registries 30 or binary registries 32 or their specific record structure. These registry class level 22 functions may include opening a file, locking a file, or operations in relation to the naming or renaming of a file. Further registry class level 22 functions or operations will be understood by those skilled in the art.

Functions for manipulating file-based registries 24 that are specific to either a binary registry 32 or a text registry 30 may be grouped at the type level 28. These type level 28 functions may include functions for adding a record, deleting a record, changing a record and retrieving a record. As discussed above, some of the operations needed to implement these functions may differ depending upon whether the registry is a binary registry 32 or a text registry 30.

Finally, the registry specific level 34 contains the specific implementation of any of the functions contained in the first three levels. To the extent required, any necessary customization of the generic registry facility 12 functions is provided by the module 14. For example, the services registry 38 will have a specific record structure that many of the generic functions will need to recognize and reference in order to perform their operations. Accordingly, this structure is defined in the module 14.

Advantageously, the generic registry facility 12 (FIG. 1) provides a flexible set of appropriately classified generic functions of varying specificity for the manipulation of a specific registry 18 (FIG. 1). The module 14 provides registry specific level 34 information for customizing the operation of generic functions to the extent necessary to the specific registry 18. The computer program 16 (FIG. 1) may then manipulate the registry 18 through the generic registry facility 12 using the generic function calls. The developer of the computer program 16 and the developer of the module 14 need not devote time and energy to the logistical and procedural mechanisms involved in manipulating a registry. For example, the developer need only call an Add command, relying upon the generic control facility 12 to ensure that the registry 18 is appropriately locked and, if desired, that no duplicate entries are found before adding the new record. The developer of the module 14 need not be concerned with the mechanics of opening, closing and locking files, or with adding, getting or changing records in a file. The developer of the module 14 simply specifies the structure of the records in the file and adds any customization necessary to the generic registry functions.

In one embodiment of the present invention, there is provided a header file and class module for each of the base level 21, the registry class level 22, and the type level 28. An embodiment of these class modules is detailed below. For example, there may be a base class module in which there may be a registry status definition, defining a number of states for a registry, such as closed, open, read, write, locked, loaded, or scan mode. The base class module may also define types of locks, such as exclusive locks or shared locks, and may define categories of registries, such as binary file-based, text file-based, or proprietary registries. The base class module may also provide a mechanism for defining what features are enabled for a module 14 for a particular registry 18. In one embodiment, the base class module defines the following format for a Features variable:

```
#define REG_FEATURE_MIN_VALUE      (1 << 0)/* Minimum Feature Value */
#define REG_FEATURE_VERIFY_ACTION  (1 << 0) /* Verify Action Feature */
#define REG_FEATURE_ALLOW_DUPLICATE (1 << 1) /* Allow Duplicates Feature */
#define REG_FEATURE_PACK_BIN_REC   (1 << 2)/* Pack Binary Records */
#define REG_FEATURE_TRIGGER        (1 << 3)/* Trigger Feature */
#define REG_FEATURE_MAX_VALUE      (1 << 3)/* Maximum Feature Value */
```

Using the foregoing definition, if, for example, the Features variable for a particular registry 18 has its second bit set, then duplicate records are allowed to appear in the registry 18. Similarly, the Features variable may indicate whether a verification feature is enabled, whether binary records are to be packed and whether a trigger feature is enabled. Further details of the verification feature and the trigger feature are provided later.

The base class may be defined in the base class module, as follows:

```
class GenRegBase
{
    public:
        GenRegBase( );
        ~GenRegBase( );
        /* Registry Locking Functions */
        int Lock              (unsigned int Action, unsigned int Timeout);
        int UnLock            (void);
        /* Registry Action Functions */
        int Add               (long long FieldSpec, void *NewRecord);
        int Change            (long long FieldSpec, void *MatchInfo, void
                              *NewRecord);
        int Get               (long long FieldSpec, void *MatchInfo, void
                              *TheRecord);
        int Delete            (long long FieldSpec, void *MatchInfo);
        int GetNext           (long long FieldSpec, void *MatchInfo, void
                              *TheRecord);
        int OpenScan          ( );
        int CloseScan         ( );
        int Rewind            ( );
        /* Feature manipulation functions */
        bool                  isFeatureSet (unsigned int featureToCheck);
        int                   setFeature (unsigned int featureToSet);
        int                   unsetFeature (unsigned int featureToUnset);
    protected:
        /* Registry specific function independent of storage method */
        virtual int MatchRecord   (long long FieldSpec, void * Record, void
* MatchInfo);
        virtual int               (long long FieldSpec, void *Record);
        ValidateRecord
        virtual int PrintRecord   (void *Record);
        /* Defines the current status of the registry */
        unsigned int Status;
        /* Defines the Features enabled for the registry */
        unsigned int Features;
        /* Defines the registry type */
        unsigned int Type;
    };
```

As will be understood by one skilled in the art, the functions and definitions provided in the above class definition are independent of how or where the registry is stored. They are independent of whether the registry is a file based registry, a Windows™ registry or another proprietary registry. The Registry Action functions are defined at the base level and provide an interface through which the computer program 16 (FIG. 1) may manipulate the registry 18 (FIG. 1). These functions may be further defined in classes inheriting from this base class so as to provide the specific functionality necessary to perform these functions for a particular class or type of registry. The FieldSpec parameter passed into the Registry Action functions is a variable in which each bit represents a field in the record affected by the action. If the bit is set, then the action is intended to affect that field in the record.

In the above base class module, variables are defined for communicating the status of the registry, the features enabled for the registry and the type of registry. These variables can be consulted by other functions for determining a course of action to take. For example, the implementation of an add function may check the Features variable to determine whether duplicate records are permitted. If they are not permitted, then the add function would perform a check to ensure the added record would not result in a duplicate record.

The base class module provides a set of functions for reading and changing the Features variable, including an isFeatureSet ( ) function, a setFeature ( ) function and a unsetFeature ( ) function. The parameter, featureToCheck, for the first function is an integer having a bit set at the location in the structure of the Features variable corresponding to the feature being checked. For example, the second bit corresponds to whether duplicates are allowed in the registry. The isFeatureSet ( ) function then performs a logical AND to determine if the feature is set. Similarly, the setFeature ( ) function and the unsetFeature ( ) function perform bit-wise operations to set or unset bits within the Features variable.

The base class module also provides a definition for a Lock ( ) function and an UnLock ( ) function. The Lock ( ) function is passed an integer indicating the particular registry action that has requested that the registry be locked. The type of action being performed may affect the type of lock applied to the registry. For example, if the Lock ( ) function was called by an Add ( ) function, then the lock applied to the registry would need to be an exclusive read/write lock; whereas if the Lock ( ) function were called by a Get ( ) function, then the lock applied could be a shared/read registry lock. The Lock ( ) function may also receive a timeout value. The UnLock ( ) function unlocks a locked registry. Like the Registry Action Features, these two functions may be further defined in a lower level class inheriting the base class.

At the registry class level 22, a file class may be defined in a file class module, as follows:

```
class   GenRegFile : public GenRegBase
{
    public:
        GenRegFile ( );
        ~GenRegFile ( );
        /* File versions of the registry lock */
        int Lock (unsigned int Action, unsigned int TimeOut);
        int UnLock (void);
        /* Functions used in conjunction with GetNext */
        int OpenScan (void);
        int CloseScan (void);
        int Rewind (void);
        /* Sets the default permissions for the registry file */
        inline void setRegFilePermissions (unsigned int Permissions)
        {
            RegFilePermissions = Permissions;
        }
        /* Sets the default permissions for the lock file */
        {
            LockFilePermissions = Permissions;
        }
    protected:
        int OpenReg (unsigned int Action);
        int CloseReg (unsigned int Action);
        /* These must be defined by derived classes */
        virtual int GetRecordSize (void *Record, size_t *Size);
        virtual int GetMaxRecordSize (size_t *Size);
        /* Strings containing the various filenames needed for the registry */
        char RegistryPath [PATH_MAX];           // Main file
        char RegistryBackupPath [PATH_MAX];     // Backup file
        char RegistryTmpPath [PATH_MAX];        // Temporary file
        char RegistryCorruptTmpPath [PATH_MAX]; //   Corrupted temporary file
        char RegistryLockPath [PATH_MAX];       // Lock file for the registry
        /* Block descriptors for the main and temp registry files */
        FILE *RegFilePtr;
        FILE *TmpFilePtr;
        /* User defined permissions for the registry file */
        unsigned int RegFilePermissions;
        /* User defined permissions for the lock file */
        unsigned int LockFilePermissions;
};
```

The functions and variables defined in the above class module are all specific to file-based registries 24. They are independent of whether the registry is a binary file 32 or a text file 30.

The file class definition contains the Lock ( ) and UnLock ( ) functions first defined in the base class. At this level, the functions are implemented with operations specific to file-based registries.

The above file class module also provides for OpenScan ( ), CloseScan ( ), and Rewind ( ) functions for use in connection with the GetNext ( ) function. In combination, these functions are used to retrieve successive records in the registry. These functions provide more detailed control over retrieving records than is available using the Get ( ) function, which is defined (in a type level 28 class module, such as GenRegText or GenRegBin) to perform locking, opening, reading, closing and unlocking of the registry automatically. The OpenScan ( ) function performs the locking and opening of the registry and the CloseScan ( ) closes and unlocks the registry. While the registry is open, the GetNext ( ) function may be called successively to advance through matching records in the registry. The Rewind ( ) function is provided to move the file pointer back to the beginning of the registry to start looking for matching records again. The OpenScan ( ), CloseScan ( ), and Rewind ( ) functions are implemented within the file class at the registry class level 22 because they are common to text and binary registries. The other Registry Action Functions are implemented at the type level 28, as they are specific to text or binary registries.

At the type level 28, a binary class may be defined in a binary class module, as follows:

```
class GenRegBin public GenRegFile
{
    public:
        GenRegBin( );
```

-continued

```
        ~GenRegBin( );
        int Add          (long long FieldSpec,
                          void *NewRecord);
        int Change       (long long FieldSpec, void * MatchInfo, void
*NewRecord);
        int Get          (long long FieldSpec, void * MatchInfo, void
* TheRecord);
        int Delete       (long long FieldSpec, void *MatchInfo);
        int GetNext      (long long FieldSpec, void *MatchInfo, void
* TheRecord);
        int Verify       (unsigned int Action, long long FieldSpec,
void *TheRecord, void *MatchInfo);
        protected:
        int WriteRecord  (FILE *FileStream, void *Record);
        int ReadRecord   (FILE *FileStream, void *Record);
        /* These may be defined by derived classes */
        virtual int PackRecord           (void **Record);
        virtual int UnpackRecord         (void ** Record);
        virtual int GetPackedRecordSize  (void *Record,
                                          size_t *Size);
    };
```

Also at the type level 28, a text class may be defined in a text class module, as follows:

```
    class GenRegText : public GenkegFile
    {
        public:
        GenRegText( );
        ~GenRegText( );
        int Add          (long long FieldSpec,
                          void *NewRecord);
        int Change       (long long FieldSpec, void *MatchInfo, void
*NewRecord);
        int Get          (long long FieldSpec, void * MatchInfo, void
*TheRecord);
        int Delete       (long long FieldSpec, void *MatchInfo);
        int GetNext      (long long FieldSpec, void * MatchInfo, void
*TheRecord);
        int Verify       (unsigned int Action, long long FieldSpec,
void *TheRecord, void *MatchInfo);
        protected:
        int OpenReg (unsigned int Action);
        int CloseReg (unsigned int Action);
        /* Functions for converting between a data structure
        and a text line */
        virtual int FormatLine (void *Record, char *Line);
        virtual int ParseLine (void *Record, char *Line);
    };
```

Both the text and the binary class modules contain implementations of the Registry Action functions: Add ( ), Change ( ), Get ( ), Delete ( ), GetNext ( ), and Verify ( ), although the implementation will vary between the two modules. For example, in the text module the Add ( ) function will include code to convert a data structure to a text line. The text module also defines two virtual functions, FormatLine ( ) and ParseLine ( ) for use in converting data structures into text lines and text lines into data structures, respectively. Accordingly, the Registry Action functions will call upon these virtual functions in order to interact with the text records of a text registry. The virtual functions will be further defined in a registry manipulation module 14 (FIG. 1) at the registry-specific level 34 where the format of the specific records will be known.

The binary module contains WriteRecord ( ) and ReadRecord ( ) functions for writing to and reading from persistent storage. The implementation of these functions for binary registries differs from the writing to and reading from persistent storage for text registries. For example, it is typical with binary registries to first read a field size in order to determine how large the following field is. The binary module also provides functions for packing binary records, if desired.

Both the text module and the binary module include a verify ( ) function, which will be described in detail later.

As will be understood by those skilled in the art, the above class modules may contain additional definitions and functions.

The above described embodiment of the generic registry facility 12 (FIG. 1) may be used to manipulate a registry in conjunction with a registry manipulation module 14 (FIG. 1). A registry manipulation module 14 is a module at the registry-specific level 34. It may be a subclass that inherits from a class at the type level 28, such as the text class or the binary class. The registry manipulation module 14 is tailored to a specific registry or a registry having a specific record format, such as the binary variable equals value registry 42, the variable equals value registry 36 and the etc/services registry 38.

The registry manipulation module 14 may include field definitions that will be used in the FieldSpec parameter and a record structure definition to provide the generic registry facility 12 functions with information about the structure of each record in the registry. The registry manipulation module 14 may also contain a class definition implementing registry-specific functions, such as ParseLine ( ) and FormatLine ( ).

By way of example, a registry manipulation module 14 for manipulating the etc/services registry on Unix™ based operating systems, Services, may include the following field definitions and a maximum number of aliases definition:

```
    #define SERVICE_NAME_FIELD       (1 << 0)
    #define SERVICE_PORT_FIELD       (1 << 1)
    #define SERVICE_PROTOCOL_FIELD   (1 << 2)
    #define SERVICE_ALIASES_FIELD    (1 << 3)
    #define SERVICE_COMMENT_FIELD    (1 << 4)
    #define MAX_ALIASES              128
```

The Services module may also contain the following record structure definition:

```
    typedef struct ServicesRec
    {
        short  Contains;
        char   *Comment;
        struct servent ServRec;
        char   Buffer [MAX_REG_LINE];
        char   *PtrBfr [MAX_ALIASES];
    }ServicesRec_t;
```

The above structure defines what each etc/services record may contain. The structure is completely self-contained, having no pointers that point to data outside of the structure. This provides the structure with the internal integrity that permits it to be passed as a generic block of data into various functions in the generic registry facility 12. The ServRec structure is a standard structure defined by the operating system. It contains pointers to the service field, a port field, and a list of optional aliases which point to the character string Buffer. Similarly, the Comment pointer points to a location in Buffer at which a comment may be found, if any.

The array of pointers PtrBfr is used in conjunction with the aliases member of ServRec to point to any aliases that are present in Buffer.

The Services module may also contain a class definition, such as the following:

```
class GenRegServices : public GenRegText
{
    public:
        GenRegServices (char *DBPath);
        ~GenRegServices (void);
        int ParseLine          (void *Record, char *Line);
        int FormatLine         (void *Record, char *Line);
        int ValidateRecord     (long long FieldSpec, void *Record);
        int PrintRecord        (void *Record);
        int MatchRecord        (long long FieldSpec, void *Record, void *MatchInfo);
        int GetRecordSize      (void *Record, size_t *Size);
        int GetMaxRecordsSize  (size_t *Size);
};
```

A computer program 16 (FIG. 1) may then manipulate the etc/services registry using the generic registry facility 12 (FIG. 1) functions, which will reference the Service module for record-specific structure information. For example, if the computer program 16 needs to get a record from the etc/services registry, it would call the Get ( ) function. The etc/servicesGenRegServices inherits from GenRegText, which inherits from GenRegFile, which inherits from GenRegBase. The Get ( ) function is provided in GenRegBase, and further defined in GenRegText. The Get ( ) function defined in GenRegText would handle the opening and locking of the etc/services registry. It does so by calling the opening and locking functions implemented within GenRegFile, the module above GenRegText. The Get ( ) function would then require the use of the MatchRecord ( ) function and the ParseLine ( ) function implemented within GenRegServices to find and parse the record. The computer program 16 would simply receive back a pointer to the record, which will have been parsed into an appropriate data structure.

In another aspect of the present invention, the GenRegText and GenRegBin modules define a Verify ( ) function. One of the bits of the Features variable defined in the base class related to whether the verify action feature was enabled. The Verify ( ) function is an embodiment of the verify action feature.

The verify action feature is a method of confirming that a change to a registry has been completed successfully before the change is implemented. As shown above, in one embodiment, the feature may be enabled or disabled through the Features variable defined in the base class. If the feature is enabled, then the Registry Action functions which are designed to change the registry 18, such as the Add ( ) function, the Change ( ) or the Delete ( ) function, will each call the Verify ( ) function. In one embodiment, the Registry Action functions will first assess whether the verify action feature is enabled. If it is not enabled, then the function performs the requested action upon the registry 18. If enabled, then the function performs the requested action upon a temporary registry and calls the Verify ( ) function to determine whether the action was performed successfully and to overwrite the registry with the temporary registry if it was.

Reference is now made to FIG. 3, which shows a method 100 for verifying a requested change to a registry 18 (FIG. 1) on a computer system, according to the present invention. The method 100 begins in step 102 with the call of a generic registry facility function by the computer program 16 (FIG. 1) that would cause a change to the registry 18. In step 104, the Features variable is checked to see if the verify action feature is enabled. If the feature is not enabled, then the method 100 proceeds to step 106 where the requested change to the registry 18 is implemented directly. Following step 106, the method 100 returns control to the computer program 16.

If the verify action feature is enabled, then following step 104 the method 100 proceeds to step 108, wherein a temporary registry is created. The temporary registry is a copy of the registry. The requested change to be made by the generic registry facility function, such as adding a record, deleting a record or changing a record, is then made to the temporary registry in step 110.

Once the change is made to the temporary registry, then in step 112, beginning with the first line of the registry 18 and the first line of the temporary registry, a line of the registry 18 and a line of the temporary registry are compared. This portion of the method 100 attempts to locate the change made to the temporary registry by identifying the point of difference between it and the registry 18. If, in step 114, the line of the registry and the line of the temporary registry are identical, then the method 100 proceeds to step 116 where the lines being considered are incremented. This may be implemented using a pointer to a line in the registry 18 and a pointer to a corresponding line in the temporary registry, wherein the pointers can be incremented in step 116. In step 118, the method 100 evaluates whether the end of the registry 18 has been reached. If it has, then the verify action feature has been unable to locate the change that was supposed to be made to the temporary registry in step 110. Accordingly, in step 120 the return code of the verify action function is set to indicate failure and the method 100 returns control to the computer program 16. Otherwise, following step 118, the method 100 loops to step 112 to compare the next lines of the registry 18 and the temporary registry.

If the method 100 locates a difference between the registry 18 and the temporary registry in step 114, then in step 122 it compares the difference to the change that had been requested. Step 124 is a decision based upon the comparison of step 122. If the difference found in the temporary registry corresponds to the requested change, then the Registry Action function performed successfully, and the method 100 advances to step 128. If the difference does not correspond to the requested change, then the function was performed incorrectly and at step 126 the method 100 sets the return code of the verify action function to indicate failure and returns control to the computer program 16.

At step 128, the verification of the change has been successful, so the method 100 performs a commit sequence. In step 128, the path to a back-up copy of the registry is unlinked. Then in step 130, the path to the back-up copy of the registry is linked to the registry 18. The temporary registry is then renamed in step 132 as the registry 18. Effectively, the temporary registry having the change made to it becomes the registry, while the unchanged registry becomes the new back-up of the registry. Accordingly, the back-up copy of the registry will always be one change removed from the current registry 18. Following the commit sequence of steps 128, 130 and 132, the method 100 returns control to the computer program 16.

The commit sequence 128, 130 and 132 is a safe method of managing the change to the registry 18 because any user or process actively viewing the original registry 18 is not affected by the commit sequence 128, 130 and 132. While the other user or process is viewing the registry, the location that the registry path is linked to will have changed. Once the user exits and subsequently tries to view the registry again the registry path will be linked to the new changed version of the registry.

An example implementation of the commit sequence, developed for use with Unix™ based operating systems, is as follows:

```
        unlink (RegistryBackupPath);            /* remove existing backup */
        link (RegistrypathPath, RegistryBackupPath);  /* link the backup path to the
registry */
        rename (RegistryTmpPath, Registry);     /* point the original to
the temporary */
```

In one embodiment, the Verify ( ) function comprises steps 112 through 132 of method 100.

In yet another aspect of the present invention, there is provided a trigger feature. In one embodiment, the trigger feature is provided through a Trigger ( ) function. Although not shown in the above-described embodiment of the type level 28 binary or text class modules, the Trigger ( ) function may be defined at the type level 28. If this feature is enabled, then the Trigger ( ) function may be called by a Registry Action function after a successful change is made to the registry 18. Alternatively, it may be called by the Verify( ) function. In one embodiment, the Trigger ( ) function is passed the parameters long long FieldSpec, int Action, and void *Record.

The trigger feature provides the ability to trigger an event in response to a change to the registry. The Trigger ( ) function can be configured within the registry manipulation module 14 to perform whatever specific task is required as a result of the change.

By way of example, the Trigger ( ) function may send an alert to other processes each time the registry changes. Alternatively, the Trigger ( ) function may evaluate the nature of the change and send an alert to another process or to an administrator depending upon the type of change made. In one embodiment, the GenRegServices module for the manipulation of the etc/services registry may include a Trigger ( ) function configured to send a signal to a running process each time an entry is changed in the etc/services registry. The running process would then know that the etc/services registry was updated and that it needs to be re-read to ensure that it is operating with accurate information.

The Trigger ( ) function may be used advantageously in the context of a cluster environment. In the event configuration information is changed in a registry, the Trigger ( ) function could be used to send an alert to processes running on other systems in the cluster to ensure that the corresponding change is made to corresponding registries on the other systems. In this manner, the Trigger ( ) function may be used to propagate changes across a network having multiple registries that require consistency.

Using the foregoing specification, the invention may be implemented as a machine, process or article of manufacture by using standard programming and/or engineering techniques to produce programming software, firmware, hardware or any combination thereof.

Any resulting program(s), having computer readable program code, may be embodied within one or more computer usable media such as memory devices, transmitting devices or electrical or optical signals, thereby making a computer program product or article of manufacture according to the invention. The terms "article of manufacture" and "computer program product" as used herein are intended to encompass a computer program existent (permanently, temporarily or transitorily) on any computer usable medium.

A machine embodying the invention may involve one or more processing systems including, but not limited to, central processing unit(s), memory/storage devices, communication links, communication/transmitting devices, servers, I/O devices, or any subcomponents or individual parts of one or more processing systems, including software, firmware, hardware or any combination or sub-combination thereof, which embody the invention as set forth in the claims.

One skilled the art of computer science will be able to combine the software created as described with appropriate general purpose or special purpose computer hardware to create a computer system and/or computer sub-components embodying the invention and to create a computer system and/or computer sub-components for carrying out the method of the invention.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A registry manipulation system for use by a computer program in manipulating a specific registry on a computer system, the specific registry having a type of storage, the registry manipulation system comprising:

a registry manipulation facility for manipulating registries including a plurality of generic functions, the generic functions being defined within classes, the classes including a first level class and a second level class, wherein the second level class inherits the generic functions of the first level class; and a registry manipulation module including a registry-specific definition for the specific registry and wherein the registry manipulation module inherits the generic functions of the second level class, wherein the first level class provides an interface usable by the computer program, and wherein the second level class provides support for the type of storage for the registry.

2. The registry manipulation system of claim 1, wherein the second level class applies to file-based registries, the file-based registries being of a category, and wherein the registry manipulation facility further includes a third level class inheriting the functions of the second level class, wherein the third level class provides support for the category of the specific registry.

3. The registry manipulation system of claim 2, wherein the category is a category selected from the group including binary and text-based.

4. The registry manipulation system of claim 1, wherein the type of storage is a proprietary storage mechanism.

5. The registry manipulation system of claim 1, wherein the type of storage is file-based.

6. The registry manipulation system of claim 5, wherein the specific registry is a file-based registry and the file-based registry has a category, and wherein the registry manipulation facility further includes a third level class inheriting the functions of the second level class, wherein the third level class provides support for the category of the specific registry.

7. The registry manipulation system of claim 6, wherein the category is a category selected from the group including binary and text-based.

8. The registry manipulation system of claim 1, wherein the registry-specific definition includes a record structure definition for records of the specific registry.

9. The registry manipulation system of claim 1, wherein the generic functions includes functions for adding, deleting, getting and changing a record in the specific registry.

10. The registry manipulation system claimed in claim 1, wherein the generic functions include:
a manipulation function for performing a requested change to the specific registry, the manipulation function for creating a temporary registry, the temporary registry being a copy of the specific registry, and for causing the requested change to be made to the temporary registry; and
a verify action function for verifying that the requested change was successful, the verify action function for comparing the temporary registry to the specific registry to identify a difference between them, for comparing the difference to the requested change to determine if the difference and the requested change match, and for replacing the specific registry with the temporary registry when the difference and the requested change match.

11. The registry manipulation system claimed in claim 10, wherein the verify action function includes a return code, the return code being indicative of whether the difference and the requested change match to indicate success or failure.

12. The registry manipulation system claimed in claim 10, wherein the specific registry has a registry path name and the computer system further includes a backup registry having a backup path name, and wherein the verify action function unlinks the backup path name from the backup registry, links the backup path name to the specific registry and renames the temporary registry with the registry path name.

13. The registry manipulation system claimed in claim 10, wherein the verify action function successively compares each line in the specific registry to each line in the temporary registry to confirm that the lines match and identifies the difference when the lines do not match.

14. The registry manipulation system claimed in claim 10, wherein the requested change includes an addition to the specific registry.

15. The registry manipulation system claimed in claim 10, wherein the requested change includes a deletion from the specific registry.

16. The registry manipulation system claimed in claim 1, wherein the generic functions include:
a manipulation function for performing a requested change to the specific registry; and
a trigger function for performing an action in response to the performance of the requested change to the specific registry.

17. The registry manipulation system claimed in claim 16, wherein the action includes sending a signal to an active process.

18. A computer program product comprising a computer readable medium carrying program instructions for use by a computer program in manipulating a specific registry on a computer system, the registry having a type of storage, the program instructions including,
providing a registry manipulation facility for manipulating registries including a plurality of generic functions for manipulating registries, the generic functions being defined within classes, the classes including a first level class and a second level class, wherein the second level class inherits the generic functions of the first level class; and
providing a registry manipulation module including a registry-specific definition for the specific registry and wherein the registry manipulation module inherits the generic functions of the second level class,
wherein the first level class provides an interface usable by the computer program, and wherein the second level class provides support for the type of storage for the registry.

19. The computer program product of claim 18, wherein the second level class applies to file-based registries, the file-based registries being of a category, and wherein the registry manipulation facility further includes a third level class inheriting the functions of the second level class, wherein the third level class provides support for the category of the specific registry.

20. The computer program product of claim 19, wherein the category is a category selected from the group including binary and text-based.

21. The computer program product of claim 18, wherein the type of storage is a proprietary storage mechanism.

22. The computer program product of claim 18, wherein the type of storage is file-based.

23. The computer program product of claim 22, wherein the specific registry is a file-based registry and the file-based registry has a category, and wherein the registry manipulation facility further includes a third level class inheriting the functions of the second level class, wherein the third level class provides support for the category of the specific registry.

24. The computer program product of claim 23, wherein the category is a category selected from the group including binary and text-based.

25. The computer program product of claim 18, wherein the registry-specific definition includes a record structure definition for records of the specific registry.

26. The computer program product of claim 18, wherein the generic functions includes functions for adding, deleting, getting and changing a record in the specific registry.

27. The computer program product of claim 18, wherein the generic functions include:
- a manipulation function for performing a requested change to the specific registry, the manipulation function for creating a temporary registry, the temporary registry being a copy of the specific registry, and for causing the requested change to be made to the temporary registry; and
- a verify action function for verifying that the requested change was successful, the verify action function for comparing the temporary registry to the specific registry to identify a difference between them, for comparing the difference to the requested change to determine if the difference and the requested change match, and for replacing the specific registry with the temporary registry when the difference and the requested change match.

28. The computer program product of claim 27, wherein the verify action function includes a return code, the return code being indicative of whether the difference and the requested change match to indicate success or failure.

29. The computer program product of claim 27, wherein the specific registry has a registry path name and the computer system further includes a backup registry having a backup path name, and wherein the verify action function unlinks the backup path name from the backup registry, links the backup path name to the specific registry and renames the temporary registry with the registry path name.

30. The computer program product of claim 27, wherein the verify action function successively compares each line in the specific registry to each line in the temporary registry to confirm that the lines match and identifies the difference when the lines do not match.

31. The computer program product of claim 27, wherein the requested change includes an addition to the specific registry.

32. The computer program product of claim 27, wherein the requested change includes a deletion from the specific registry.

33. The computer program product of claim 18, wherein the generic functions include:
- a manipulation function for performing a requested change to the specific registry; and
- a trigger function for performing an action in response to the performance of the requested change to the specific registry.

34. The computer program product of claim 33, wherein the action includes sending a signal to an active process.

* * * * *